US012608438B2

(12) United States Patent
Ohzeki

(10) Patent No.: US 12,608,438 B2
(45) Date of Patent: Apr. 21, 2026

(54) COMBINATORIAL OPTIMIZATION PROBLEM PROCESSING APPARATUS, COMBINATORIAL OPTIMIZATION PROBLEM PROCESSING METHOD, AND PROGRAM

(71) Applicant: TOHOKU UNIVERSITY, Sendai (JP)

(72) Inventor: Masayuki Ohzeki, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 1026 days.

(21) Appl. No.: 17/770,483

(22) PCT Filed: Oct. 22, 2020

(86) PCT No.: PCT/JP2020/039702
§ 371 (c)(1),
(2) Date: Apr. 20, 2022

(87) PCT Pub. No.: WO2021/085297
PCT Pub. Date: May 6, 2021

(65) Prior Publication Data
US 2022/0398293 A1     Dec. 15, 2022

(30) Foreign Application Priority Data
Oct. 29, 2019     (JP) ................................. 2019-196324

(51) Int. Cl.
G06F 17/11          (2006.01)
G06N 10/40          (2022.01)
G06N 10/60          (2022.01)
(52) U.S. Cl.
CPC ............. *G06F 17/11* (2013.01); *G06N 10/40* (2022.01); *G06N 10/60* (2022.01)

(58) Field of Classification Search
CPC ...... G06F 17/10–13; G06N 5/01; G06N 7/00; G06N 7/01; G06N 10/00–60; G06Q 10/04; G06Q 10/047
See application file for complete search history.

(56) References Cited

U.S. PATENT DOCUMENTS

2018/0240034 A1     8/2018   Harris
2019/0235033 A1     8/2019   Ohzeki
(Continued)

FOREIGN PATENT DOCUMENTS

JP          2018533106 A        11/2018
JP          2021060714 A   *   4/2021
WO          2018074006 A1       4/2018

OTHER PUBLICATIONS

"The D-Wave 2000Q System", [online], D Wave the Quantum Computing Company, retrieved on Oct. 8, 2019.
(Continued)

*Primary Examiner* — Andrew Caldwell
*Assistant Examiner* — Huy Duong
(74) *Attorney, Agent, or Firm* — PROCOPIO, CORY, HARGREAVES & SAVITCH LLP

(57)                    ABSTRACT

A combinatorial optimization problem processing apparatus includes an annealing unit that acquires, using an annealing scheme, a candidate for a first solution that is a variable q satisfying a first condition regarding a partition function whose Hamiltonian is a function representing a combination optimization problem that is an analysis target and the function includes third- or higher-order terms of a variable q, the Hamiltonian being represented by an integral representation using a variable X, the Hamiltonian being represented by a sum of a first equation that includes only second- or lower-order terms of the variable q and a second equation that does not include the variable q, in an alternate optimization algorithm in which first optimization processing for
(Continued)

1

COMBINATORIAL OPTIMIZATION PROBLEM PROCESSING APPARATUS

11
CONTROL UNIT 91
PROCESSOR
92
MEMORY

15
STATE MEASUREMENT UNIT

12
STORAGE UNIT

13
INPUT UNIT

14
OUTPUT UNIT acquiring the first solution and second optimization processing for acquiring a second solution that is a variable X satisfying a second condition regarding the partition function are repeated until an end condition is satisfied, a calculation unit that acquires the second solution, and a solution candidate acquisition unit that acquires a candidate for the immediately preceding first solution when the end condition is satisfied, as a candidate for a solution of the combinatorial optimization problem.

11 Claims, 5 Drawing Sheets

(56) References Cited

U.S. PATENT DOCUMENTS

| | | | | | |
|---|---|---|---|---|---|
| 2020/0234172 | A1* | 7/2020 | King | | G06F 18/23213 |
| 2020/0349459 | A1* | 11/2020 | Cao | | G06F 17/11 |
| 2021/0011748 | A1* | 1/2021 | Lee | | G06N 10/20 |
| 2021/0232657 | A1* | 7/2021 | Irie | | G06N 10/60 |
| 2022/0414518 | A1* | 12/2022 | You | | G06Q 10/04 |
| 2023/0067878 | A1* | 3/2023 | Ronagh | | G06F 17/11 |

OTHER PUBLICATIONS

International Search Report for related Application No. PCT/JP2020/039702, mailed Dec. 22, 2020.

Written Opinion for related Application No. PCT/JP2020/039702, mailed Dec. 22, 2020.

Australian Patent Office, Office Action, Application No. 2020376359, dated Oct. 14, 2025, in 6 pages.

Smelyanskiy, Vadim N., et al. "A near-term quantum computing approach for hard computational problems in space exploration." arXiv preprint arXiv:1204.2821 (2012).

Blum, A L et al. "Fast Planning Through Planning Graph Analysis" in Artificial Intelligence, 90:281-300, 1997 <URL: https://www.cs.cmu.edu/~avrim/Papers/graphplan.pdf >.

Haidine, A. et al. "Multi-Case Multi-Objective Simulated Annealing (MC-MOSA): New Approach to Adapt Simulated Annealing to Multiobjective Optimization" World Academy of Science, Engineering and Technology International Journal of Computer and Information Engineering vol. 2, No. 12, 2008.

Yan, J. et al. "Adaptive Discrete Hypergraph Matching" IEEE Transactions on Cybernetics, vol. 48, No. 2, Feb. 2018 p. 765-779.

* cited by examiner

FIG. 1

COMBINATORIAL OPTIMIZATION PROBLEM PROCESSING APPARATUS, COMBINATORIAL OPTIMIZATION PROBLEM PROCESSING METHOD, AND PROGRAM

CROSS-REFERENCE TO RELATED APPLICATIONS

This application is a US national stage application of International Application PCT/JP2020/039702, filed Oct. 22, 2020, and claims foreign priority under 35 USC § 119 to Japanese Patent Application No. 20-19-196324, filed Oct. 29, 2019, the contents of which are incorporated by reference.

TECHNICAL FIELD

The present invention relates to a combinatorial optimization problem processing apparatus, a combinatorial optimization problem processing method, and a program.

Priority is claimed on Japanese Patent Application No. 2019-196324, filed Oct. 29, 2019, the content of which is incorporated herein by reference.

BACKGROUND ART

In recent years, research on machine learning, deep learning, and artificial intelligence has progressed. In the machine learning, deep learning, and artificial intelligence, one of important issues is to process a combinatorial optimization problem such as a traveling salesman problem at high speed. Therefore, there is increasing anticipation for implementation of a apparatus that processes the combinatorial optimization problems at high speed. One of the apparatuses that process such a combinatorial optimization problem at high speed is a quantum annealing machine (Non-Patent Literature 1) that processes an optimization problem through quantum annealing. The quantum annealing machine is a computer in which a quantum bit is a basic element and is a computer including a plurality of quantum bits. The quantum annealing machine acquires information indicating a predetermined eigenstate (for example, a ground state) in a system including a plurality of quantum bits included in the host apparatus (hereinafter referred to as a "bit system") through measurement of the hit system (quantum annealing). The information indicating the eigenstate is, specifically, information indicating a distribution of values indicated by the respective quantum bits in the eigenstate. The quantum annealing machine outputs an acquisition result as a candidate for a solution of the combinatorial optimization problem.

CITATION LIST

Non-Patent Literature

[Non-Patent Literature 1]
"The D-Wave 2000Q System", [online], D Wave The Quantum Computing Company, [retrieved on Oct. 8, 2019]. Internet <URL: https://www.dwavesys.com/d-wave-two-system>

SUMMARY OF INVENTION

Technical Problem

However, the quantum annealing machine of the related art has a problem that the quantum annealing machine can handle only a combinatorial optimization problem represented in a second-order form because the quantum annealing machine uses an interaction between adjacent quantum bits. Therefore, in the related art, a candidate for a solution for an equation including third- or higher-order terms of a variable cannot be acquired by using an annealing scheme.

Further, such a problem is not limited to the quantum annealing machine and is a common problem with respect to apparatuses that output a candidate for a solution of the combinatorial optimization problem using an annealing scheme.

In view of the above circumstances, an object of the present invention is to provide a technology for acquiring a candidate for a solution of a combinatorial optimization problem represented by a function including third- or higher-order terms of a variable, by using an annealing scheme.

Solution to Problem

An aspect of the present invention is a combinatorial optimization problem processing apparatus comprising: an annealing unit configured to acquire, using an annealing scheme, a candidate for a first solution in an alternate optimization algorithm in which a first optimization processing and a second optimization processing are repeated until a predetermined end condition is satisfied; a calculation unit configured to acquire a second solution; and a solution candidate acquisition unit configured to acquire a candidate for the immediately preceding first solution when the end condition is satisfied, as a candidate for a solution of the combinatorial optimization problem that is an analysis target; wherein, the first solution is the variable q that satisfies a first predetermined condition regarding a maximum value of a root finding target partition function and that is acquired by the first optimization processing, the first optimization processing acquiring a value of the variable q satisfying the first predetermined condition, the variable q being the sole independent variable of the first optimization processing, the root finding target partition function being a partition function whose Hamiltonian is an analysis target function, the analysis target function being a function representing the combination optimization problem and is a function including third- or higher-order terms of a variable q, the Hamiltonian being represented by a predetermined integral representation using a variable X, the Hamiltonian being represented by a sum of a first equation that includes only second- or lower-order terms of the variable q and a second equation not including the variable q, the second solution being the variable X that satisfies a second predetermined condition regarding a maximum value of the root finding target partition function and that is acquired by the second optimization processing, the second optimization processing acquiring a value of the variable X satisfying the second predetermined condition, the variable X being the sole independent variable of the second optimization processing.

An aspect of the present invention is the combinatorial optimization problem processing apparatus, wherein the first predetermined condition is a condition that a value of the partition function is a local maximum value.

An aspect of the present invention is the combinatorial optimization problem processing apparatus, wherein the second predetermined condition is a condition that a value of the partition function is a local maximum value.

An aspect of the present invention is the combinatorial optimization problem processing apparatus, wherein the predetermined integral representation is a Fourier integral representation.

An aspect of the present invention is the combinatorial optimization problem processing apparatus, wherein the annealing scheme is quantum annealing.

An aspect of the present invention is the combinatorial optimization problem processing apparatus, wherein the calculation unit acquires the second solution using a root finding algorithm.

An aspect of the present invention is a combinatorial optimization problem processing method comprising: an annealing step of acquiring, using an annealing scheme, a candidate for a first solution in an alternate optimization algorithm in which a first optimization processing and a second optimization processing are repeated until a predetermined end condition is satisfied; a calculation step of acquiring a second solution; and a solution candidate acquisition step of acquiring a candidate for the immediately preceding first solution when the end condition is satisfied, as a candidate for a solution of the combinatorial optimization problem that is an analysis target; wherein, the first solution is the variable q that satisfies a first predetermined condition regarding a maximum value of a root finding target partition function and that is acquired by the first optimization processing, the first optimization processing acquiring a value of the variable q satisfying the first predetermined condition, the variable q being the sole independent variable of the first optimization processing, the root finding target partition function being a partition function whose Hamiltonian is an analysis target function, the analysis target function being a function representing the combination optimization problem and is a function including third- or higher-order terms of a variable q, the Hamiltonian being represented by a predetermined integral representation using a variable X, the Hamiltonian being represented by a sum of a first equation that includes only second- or lower-order terms of the variable q and a second equation not including the variable q, the second solution being the variable X that satisfies a second predetermined condition regarding a maximum value of the root finding target partition function and that is acquired by the second optimization processing, the second optimization processing acquiring a value of the variable X satisfying the second predetermined condition, the variable X being the sole independent variable of the second optimization processing.

An aspect of the present invention is a program for causing a computer to function as the combinatorial optimization problem processing apparatus.

Advantageous Effects of Invention

According to the present invention, it is possible to acquire a candidate for a solution of a combinatorial optimization problem represented by a function including third- or higher-order terms of a variable, by using an annealing scheme.

BRIEF DESCRIPTION OF DRAWINGS

FIG. 1 is a diagram illustrating an example of a functional configuration of a combinatorial optimization problem processing apparatus 1 of an embodiment.

DESCRIPTION OF EMBODIMENTS

Embodiment

Figure 1:
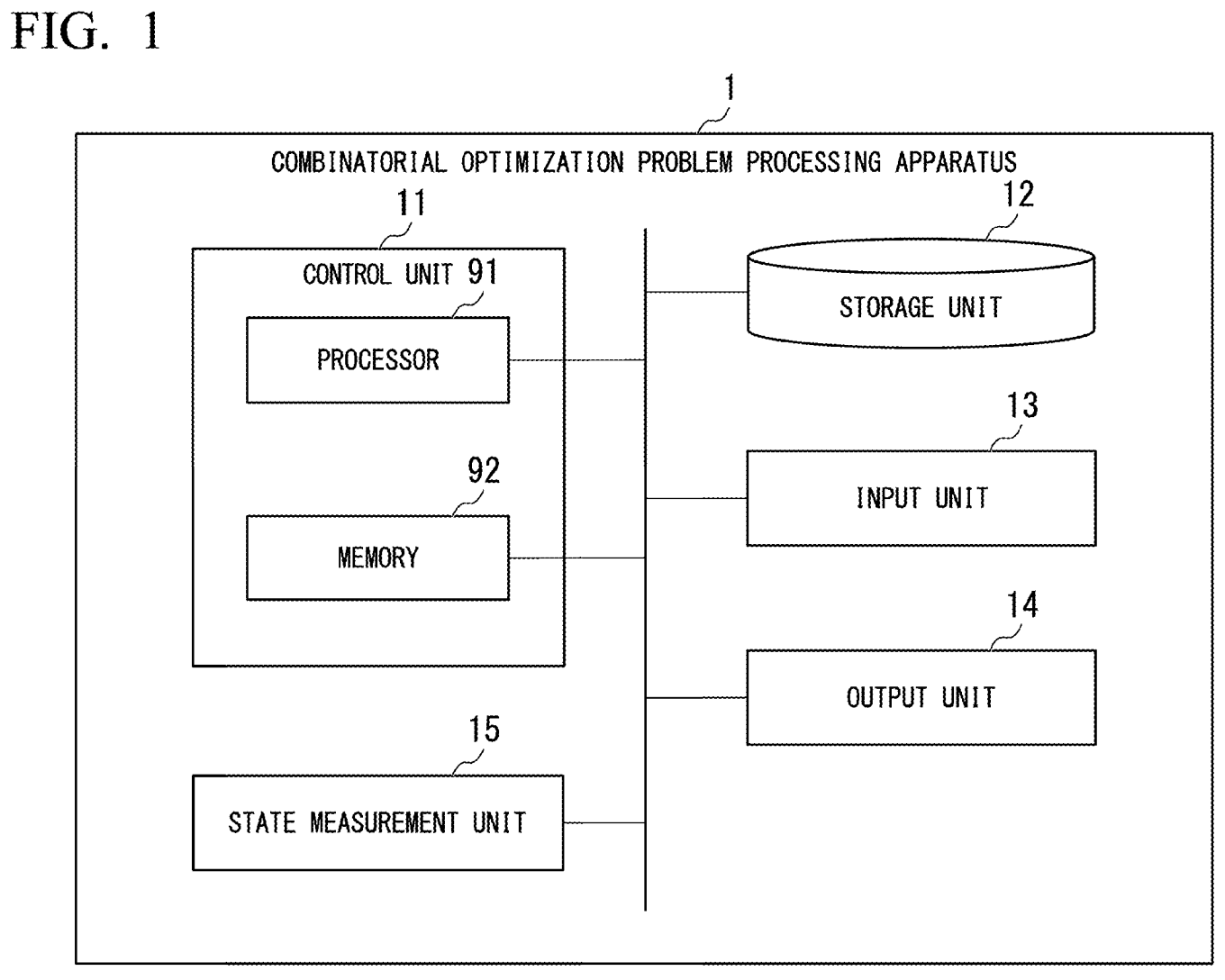
Figure 2:
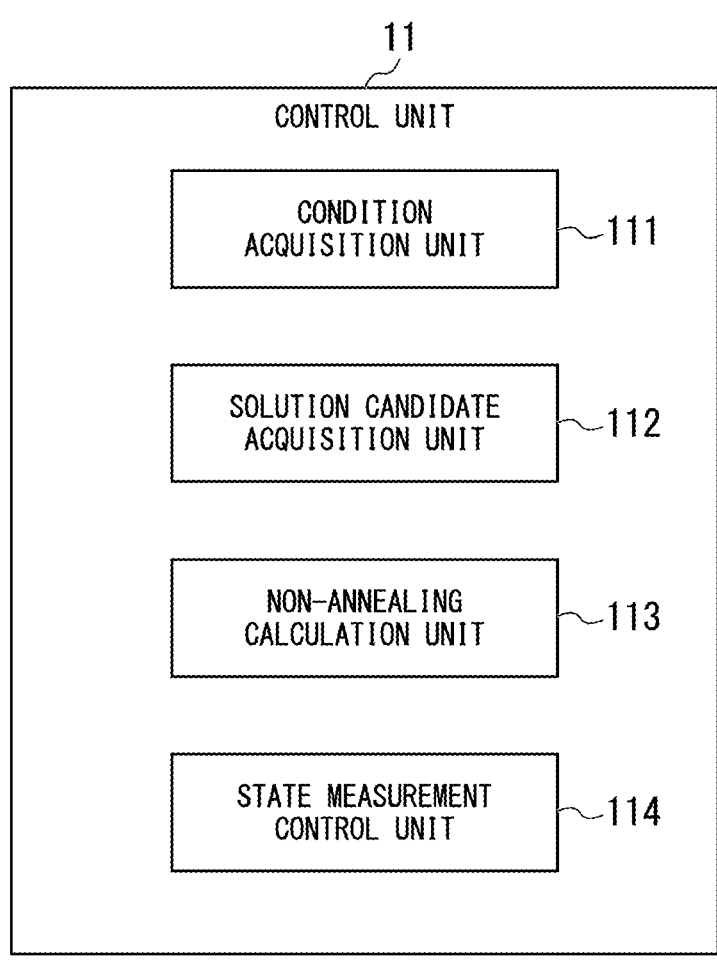
FIG. 2 is a diagram illustrating an example of a functional configuration of a control unit 11 in the embodiment.

FIG. 1 is a diagram illustrating an example of a functional configuration of a combinatorial optimization problem processing apparatus 1 of an embodiment. First, an overview of the combinatorial optimization problem processing apparatus 1 will be described.
<Overview of the Combinatorial Optimization Problem Processing Apparatus 1>

The combinatorial optimization problem processing apparatus 1 is a apparatus that acquires candidates for a solution of a combinatorial optimization problem such as optimization of traffic management, which is a combinatorial optimization problem that is an analysis target, by using an annealing scheme. More specifically, the combinatorial optimization problem processing apparatus 1 is a apparatus that acquires a solution of the combinatorial optimization problem represented by a function including third- or higher-order terms $g_i$ of a variable (hereinafter referred to as an "analysis target function") by using the annealing scheme. Specifically, the solution of the combinatorial optimization problem represented by the analysis target function is acquired by acquiring a candidate for a value of a variable that satisfies a predetermined condition representing the combinatorial optimization problem that is an analysis target (hereinafter referred to as a "combinatorial condition") using the annealing scheme.

The combinatorial condition may be any condition as long as the combinatorial condition represents the combination optimization problem that is an analysis target. The combinatorial condition is, for example, a condition that a value of the analysis target function is a minimum value. The combinatorial condition is a condition that the value of the analysis target function is a local minimum value, for example, depending on the combination optimization problem that is an analysis target. The combinatorial condition is a condition that the value of the analysis target function is a local maximum value, for example, depending on the combination optimization problem that is an analysis target. Hereinafter, the combinatorial optimization problem processing apparatus 1 in an example of a case in which the combinatorial condition is the condition that the value of the analysis target function is a minimum value, for simplicity of description, will be described. Hereinafter, the value of the variable satisfying the combinatorial condition is referred to as a conditional solution of the analysis target function. That is, the conditional solution of the analysis target function is the solution of the combinatorial optimization problem that is an analysis target. i is an integer equal to or larger than 1 and equal to or smaller than 1 (1 is an integer equal to or larger than 1). A different i is a symbol for distinguishing respective third- or higher-order terms $g_i$. The analysis target function is, for example, an equation expressed by Equation (1).

[Equation 1]

$$f(q) = f_0(q) - \sum_i g_i(q) = 0 \tag{1}$$

[Equation 2]

$$f_0(q) = q^T Q q \tag{2}$$

In Equation (1), f(q) represents the analysis target function. In Equation (1), q represents a variable in the analysis target function. The variable q is a scalar or a vector. Hereinafter, the combinatorial optimization problem processing apparatus 1 in an example of a case in which q is a vector having N elements, for simplicity of description, will be described. Each of elements of the variable q is a binary variable.

In Equation (1), $f_0(q)$ is a term included in an analysis target function f(q) and represents a quadratic term of the variable q. In Equation (1), the second term of a middle equation represents a sum of the third- or higher-order terms of the variable q among respective terms of the analysis target function f(q). In Equation (2), the superscript T represents a transpose of the variable q. In Equation (2), Q represents a coefficient matrix.

When the analysis target function f(q) is regarded as a Hamiltonian representing a predetermined system such as a quantum system, a partition function Z represented by the Hamiltonian f(q) is expressed by Equation (3) below.

[Equation 3]

$$Z = \sum_q e^{(-\beta f(q))} \tag{3}$$

In Equation (3), β represents a reverse temperature of the temperature of the system when a state of the system is measured using the annealing scheme, which will be described below. In Equation (3), a sigma symbol Σ means calculating values of an item to the right of the sigma symbol Σ for respective elements of the variable q and obtaining a sum of the calculated values. When an exponent of an exponential function with a Napier's number on the right side of Equation (3) as a base is expressed by a Fourier integral representation using the variable x, Equation (3) is expressed by Equation (4) below. Hereinafter, Equation (4) is referred to as a first Fourier representation equation. The variable x is an I-dimensional vector having $x_i$ as an element. When q is a vector, xi is also a vector.

[Equation 4]

$$\sum_q e^{(-\beta f(q))} = \int dx \sum_q \exp\left(-\beta f_0(q) - \sum_i g_i(x_i)\right) \delta(x_i - q) \tag{4}$$

In Equation (4), δ( . . . ) represents a Dirac's delta function. Thus, the first Fourier representation equation includes a delta function in which a difference between the variable x and the variable q is an argument.

When a delta function of Equation (4) is expressed by the Fourier integral representation using the variable X, the delta function of Equation (4) is expressed by Equation (5) below. The variable X is an I-dimensional vector having $X_j$ as an element. When q is a vector, Xi is also a vector.

[Equation 5]

$$\delta(x_i - q) = \int dX \exp\left(-\beta \sum_i X_i(x_i - q)\right) \tag{5}$$

From Equations (3), (4) and (5), the partition function Z is expressed by Equation (6) below. Hereinafter, Equation (6) is referred to as a second Fourier representation equation.

[Equation 6]

$$Z = \int dx \int dX \sum_q \exp\left(-\beta f_0(q) + \beta \sum_i X_i q - \beta \sum_i X_i x_i + \beta \sum_i g_i(x_i)\right) \tag{6}$$

From a comparison of Equation (3) with Equation (6), it can be seen that the analysis target function f(q) is expressed by Equation (7) below.

[Equation 7]

$$f(q) = H_1 + H_2 \tag{7}$$

However, $H_1$ of Equation (7) is expressed by Equation (8) below, and $H_2$ of Equation (7) is expressed by Equation (9) below. Hereinafter, $H_1$ is referred to as a first analysis target term. Hereinafter, $H_2$ is referred to as a second analysis target term.

[Equation 8]

$$H_1 = f_0(q) - \frac{1}{\beta} \sum_i X_i q \tag{8}$$

[Equation 9]

$$H_2 = \log \int dx \exp\left(\frac{1}{\beta} \sum_i X_i q - \frac{1}{\beta} \sum_i g_i(x_i)\right) \tag{9}$$

Thus, the analysis target function f(q), which is a function including the third- or higher-order terms of the variable q, is converted into a function including only a second- or lower-order terms of the variable q by using the variables X and x. More specifically, the analysis target function f(q) is transformed into an equation of a sum of the first analysis target term including only second- or lower-order terms of the variable q and the second analysis target term not including the variable q, by using the variables X and x. In the case of an equation showing that a value of a function including only the second- or lower-order terms of the variable q is equal to 0, a solution of the equation can be acquired by using an annealing scheme such as quantum annealing (see, for example, Non-Patent Literature 1).

As is well known in physics of a quantum system such as quantum statistical mechanics, the Hamiltonian has a minimum value when the partition function has a maximum value. Therefore, the conditional solution of the analysis target function is the variable q, a variable q giving a local minimum value of a function with the variable X and the variable x as variables, and a variable q in the variable X and the variable x. In particular, when the variable x is a function of the variable q or the variable X, the conditional solution of the analysis target function is a variable q giving a local minimum value of a function with the variable q and the variable X as variables, and a variable q in the variable X.

As will be described below, because the variable x is a function of the variable q, the combinatorial optimization problem processing apparatus 1 executes an alternate optimization algorithm to be described below using am annealing scheme and a non-annealing scheme to acquire the conditional solution of the analysis target function. The non-annealing scheme means a scheme other than annealing.

The alternate optimization algorithm that is executed by the combinatorial optimization problem processing apparatus 1 is an algorithm for alternately repeating first optimization processing and second optimization processing until a predetermined end condition is satisfied. The first optimization processing is processing for acquiring the variable q satisfying a first predetermined condition regarding a maximum value of the partition function Z (hereinafter referred to as a "first partition function condition"), with only the variable q as an independent variable. Hereinafter, the variable q satisfying the first partition function condition is referred to as a first solution. The first partition function condition is, for example, a condition that a difference between the value of the partition function Z and the maximum value of the partition function Z is smaller than a predetermined value. The first partition function condition may be, for example, a condition that the value of the partition function Z is the maximum value of the partition function Z. The first partition function condition may be a condition that the value of the partition function Z is the maximum value. Hereinafter, the combinatorial optimization problem processing apparatus 1 in an example of a case in which the first partition function condition is a condition that the value of the partition function Z is a maximum value, for simplicity of description, will be described.

The second optimization processing is processing for acquiring the variable X satisfying a second predetermined condition regarding the maximum value of the partition function Z (hereinafter referred to as a "second partition function condition"), with only the variable X as an independent variable. Hereinafter, the variable X satisfying the second partition function condition is referred to as a second solution. The second partition function condition is, for example, a condition that the difference between the value of the partition function Z and the maximum value of the partition function Z is smaller than a predetermined value. The second partition function condition may be, for example, a condition that the value of the partition function Z is the maximum value of the partition function Z. The second partition function condition may be a condition that the value of the partition function Z is a local maximum value. Hereinafter, the combinatorial optimization problem processing apparatus 1 in an example of a case in which the second partition function condition is a condition that the value of the partition function Z is a local maximum value, for simplicity of description, will be described.

More specifically, in the alternate optimization algorithm that is executed by the combinatorial optimization problem processing apparatus, the first solution is first acquired through execution of the first optimization processing. Then, the first solution is assigned to the partition function Z. Then, the variable X (that is, the second solution) that gives the local maximum value of the partition function Z after the assignment, with the variable X as the independent variable, is acquired. Then, the value of the variable q that gives the local maximum value of the partition function Z to which the second solution has been assigned, with the variable q as an independent variable, is acquired. Then, the variable X that gives the local maximum value of the partition function Z after the acquired variable q is assigned, with the variable X as an independent variable, is acquired. In the alternate optimization algorithm that is executed by the combinatorial optimization problem processing apparatus 1, processing for acquiring such first solution and second solution is hereinafter repeated until a predetermined end condition (hereinafter referred to as an "optimization end condition") is satisfied. The optimization end condition is, for example, a condition that change in the value of the first solution is smaller than a predetermined value.

The combinatorial optimization problem processing apparatus 1 executes the first optimization processing using an annealing scheme such as quantum annealing. Because the combinatorial optimization problem processing apparatus 1 acquires the first optimization processing using the annealing scheme, the first solution that is acquired by the combinatorial optimization problem processing apparatus 1 is a set of the value of the variable q and a probability density of each value of the variable q.

A case in which the first solution that is acquired by the combinatorial optimization problem processing apparatus 1 is the set of the value of the variable q and the probability density of each value of the variable q will be described herein. In the annealing scheme, a state of a system that is an annealing target (hereinafter referred to as an "annealing target system") is measured. The annealing target system is a system including a plurality of physical quantum bits in which the Hamiltonian is expressed by Equation (8). The annealing target system is, for example, a quantum system such as a spin system represented by an king model. Hereinafter, the combinatorial optimization problem processing apparatus 1 in an example of a case in which the annealing scheme is quantum annealing and the annealing target system is a spin system represented by the Ising model will be described. The value of the variable q indicates a state of the physical quantum bit such as a spin of an electron included in the annealing target system.

When the state is measured for the annealing target system, a value of a physical quantity and a probability density of the physical quantity are measured, as is well known in physics of a quantum system, such as quantum mechanics. Therefore, when the combinatorial optimization problem processing apparatus 1 acquires the value of the variable q using a quantum annealing scheme, the combinatorial optimization problem processing apparatus 1 measures a value of a physical quantity corresponding to the variable q and a probability density of the value of the physical quantity corresponding to the variable q. The measurement of not only the value of the physical quantity but also the probability density of the value of the physical quantity is not limited to the quantum annealing and may adopt any method as long as the method is annealing scheme.

In the annealing scheme, values of the variable X and the variable x are information for Hamiltonian controlling the state of the annealing target system expressed by Equation (8) (hereinafter referred to as "annealing control information"). For example, when the annealing scheme is quantum annealing and the annealing target system is the spin system represented by the Ising model, the value of the variable X in the annealing scheme is a value regarding a direction and strength of the magnetic field applied to the spin. The direction and strength of the magnetic field are, specifically, values determined by the value of the partition function Z and the variable X. Further, in such a case, a value of the variable x in the annealing scheme is an expected value of the variable q indicated by the first solution acquired in the immediately preceding first optimization processing. The expected value of the variable q is, specifically, a value according to the partition function Z. The annealing control information includes form information, equation coefficient information, and temperature information, which will be described below, in addition to the values of the variable X and the variable x.

The values of the variable x and the variable X may be acquired by any device as long as the device acquires the values using the non-annealing scheme. The device that acquires the value using the non-annealing scheme is, for example, a Neumann type computer.

<Details of Annealing Scheme>

Here, an annealing scheme for acquiring the value of the variable q will be described in greater detail. Because the analysis target function f(q) can be regarded as the Hamiltonian representing the predetermined system such as the quantum system as described above, the first analysis target term $H_1$ can also be regarded as a Hamiltonian of a partial system of the Hamiltonian f(q). A partition function $Z_1$ represented by Hamiltonian $H_1$ is expressed by Equation (10) below.

[Equation 10]

$$Z_1 = \sum_q e^{(-\beta H_1)} \tag{10}$$

Further, the combinatorial optimization problem processing apparatus 1 acquires the variable q that gives the local maximum value of the partition function Z expressed by Equation (6) using the annealing scheme, as described above. Because the second analysis target term does not explicitly include the variable q, the processing for acquiring the variable q giving the local maximum value of the partition function Z is equivalent to the processing for acquiring the variable q giving the local maximum value of the partition function $Z_1$. Therefore, the combinatorial optimization problem processing apparatus 1 acquires a solution in which a value of a first derivative of a partition function in which the first analysis target term is a Hamiltonian is set to 0 using the annealing scheme. That is, the combinatorial optimization problem processing apparatus 1 acquires, using the annealing scheme, a solution satisfying Equations (11) and (12) below using the annealing scheme.

[Equation 11]

$$\frac{\partial Z_1}{\partial x_i} = 0 \tag{11}$$

[Equation 12]

$$\frac{\partial Z_1}{\partial X_i} = 0 \tag{12}$$

The processing for acquiring a solution satisfying Equations (11) and (12) using the annealing scheme is processing for measuring a quantum state of a quantum system in which the Hamiltonian is expressed by Equation (8), which is a quantum state in which the partition function $Z_1$ has a maximum value, for example, when the annealing scheme is quantum annealing. Hereinafter, the quantum state of the quantum system in which the Hamiltonian is expressed by Equation (8), which is the quantum state in which the partition function $Z_1$ has a maximum value, is referred to as a target quantum state. The quantum state in which the partition function Z1 has a maximum value is a ground state of the quantum system in which the Hamiltonian is expressed by Equation (8).

<Second Optimization Processing>

Here, the second optimization processing will be described in greater detail. In the second optimization processing, the expected value of the variable q acquired by immediately preceding annealing is assigned to the variable x. That is, the variable x is updated to the value expressed by Equation (13) below by the second optimization processing.

[Equation 13]

$$x_i = \langle q \rangle_q \tag{13}$$

The second solution is acquired, for example, by using a root finding algorithm whose update equation is Equation (14) below.

[Equation 14]

$$X_i = \frac{\partial g_i(x_i)}{\partial x_i} \tag{14}$$

The update equation of Equation (14) is an update equation of the root finding algorithm for obtaining a solution of Equation (15) below when the value of the variable x is the value expressed by Equation (13).

[Equation 15]

$$H_2 = O \tag{15}$$

Equation (15) indicates that a value of the second analysis target term is equal to 0.

The root finding algorithm may be any algorithm as long as a solution of Equation (15) below can be obtained when the value of the variable x is the value expressed by Equation (13). The root finding algorithm may be, for example, a gradient method. The root finding algorithm may be, for example, a dichotomy. The root finding algorithm may be, for example, an iterative imputation method.

<Details of Apparatus>

Hereinafter, the combinatorial optimization problem processing apparatus 1 will be described more specifically by describing respective functional units included in the combinatorial optimization problem processing apparatus 1.

The combinatorial optimization problem processing apparatus 1 includes a control unit 11 including a processor 91 such as a central processing unit (CPU) and a memory 92 connected by a bus such as a central processing unit (CPU) connected by a bus and executes a program. The combinatorial optimization problem processing apparatus 1 functions as a apparatus including the control unit 11, a storage unit 12, an input unit 13, an output unit 14, and a state measurement unit 15 through execution of a program.

All or some of respective functions of the combinatorial optimization problem processing apparatus 1 may be realized by using hardware such as an application specific integrated circuit (ASIC), a programmable logic device (FED), or a field programmable gate array (FPGA). A program may be recorded on a computer-readable recording medium. The computer-readable recording medium is, for example, a portable medium such as a flexible disk, a magneto-optical disc, a ROM, or a CD-ROM, or a storage device such as a hard disk built in a computer system. The program may be transmitted via a telecommunication line.

The control unit 11 controls an operation of each of functional units of the combinatorial optimization problem processing apparatus 1.

FIG. 2 is a diagram illustrating an example of the functional configuration of the control unit 11 in the embodiment. In FIG. 2, a functional unit regarding acquisition of candidates for a solution of the analysis target function is illustrated. The control unit 11 includes a condition acquisition unit 111, a solution candidate acquisition unit 112, a non-annealing calculation unit 113, and a state measurement control unit 114.

The condition acquisition unit 111 acquires the analysis target function, and information indicating a temperature of the system when the state of the system is measured using an annealing scheme such as a reverse temperature (hereinafter referred to as "temperature information"). The acquisition of the analysis target function, specifically, means acquiring information indicating a form of the analysis target function, such as a variable and an order constituting each term of the analysis target function, information indicating a value of a coefficient of each term of the analysis target function, and information indicating that the value of the analysis target function is 0. Each of the information indicating a form of the analysis target function (hereinafter referred to as "form information"), the information indicating the value of the coefficient of each term of the analysis target function (hereinafter referred to as "equation coefficient information"), and the information indicating that the value of the analysis target function is 0 (hereinafter referred to as "zero information") is one of the annealing control information. The temperature information may indicate, for example, the reverse temperature.

The condition acquisition unit 111 may acquire the analysis target function and the temperature information in any way. The condition acquisition unit 111 may acquire, for example, the analysis target function and the temperature information input to the input unit 13 via the bus to acquire the analysis target function and the temperature information. The condition acquisition unit 111 may read, for example, the analysis target function and the temperature information stored in the storage unit 12 from the storage unit 12 to acquire the analysis target function and a value indicating the temperature of the system.

The solution candidate acquisition unit 112 determines whether or not the optimization end condition is satisfied and acquires the first solution acquired by the immediately preceding first optimization processing as a candidate for the solution of the analysis target function when the optimization end condition is satisfied. The candidate for the solution acquired by the solution candidate acquisition unit 112 is a candidate for the solution of the combinatorial optimization problem that is an analysis target.

The non-annealing calculation unit 113 updates the value of the variable x stored in the storage unit 12, which is described below in detail, to a value expressed by Equation (13) on the basis of a measurement result of the state measurement unit 15 that will be described below in detail. Further, the non-annealing calculation unit 113 acquires the second solution on the basis of the measurement result of the state measurement unit 15 that will be described below in detail. The measurement result of the state measurement unit 15, specifically, is the value of the variable q and the probability density of each value of the variable q. The non-annealing calculation unit 113 acquires the second solution using the non-annealing scheme. The non-annealing calculation unit 113 updates the value of the variable X stored in the storage unit 12, which will be described in detail below, with the acquired second solution.

The state measurement control unit 114 controls an operation of the state measurement unit 15 on the basis of the annealing control information. The state measurement control unit 114 outputs an annealing start instruction to the state measurement unit 15 each time a second solution is acquired until the optimization end condition is satisfied. The annealing start instruction is a signal for causing the state measurement unit 15 to start annealing. Further, the state measurement unit 15 outputs the annealing start instruction to the state measurement control unit 114 even when the analysis target function and the temperature information are input to the input unit 13. The input of the analysis target function means that the form information, the equation coefficient information, and the zero information are input to the input unit 13.

The control unit 11 may operate with any mechanism as long as the condition acquisition unit 111, the solution candidate acquisition unit 112, the non-annealing calculation unit 113, and the state measurement control unit 114 operate. The control unit 11 may operate by means of the same mechanism as that of a Neumann type computer, for example.

The description returns to FIG. 1.

The storage unit 12 is configured by using a storage device such as a magnetic hard disk device or a semiconductor storage device. The storage unit 12 stores various types of information on the host device. The storage unit 12 stores, for example, the measurement result of the state measurement unit 15. The storage unit 12 stores, for example, the annealing control information. More specifically, the storage unit 12 stores, for example, initial values of the variable X and the variable x. Further, the storage unit 12 stores the variable X and the variable x after updating, for example, each time the variable X and the variable x are updated due to the execution of the second optimization processing. Further, the storage unit 12 stores, for example, the analysis target function. The storage of the analysis target function, specifically, means storing the form information, the equation coefficient information, and the zero information. Further, the storage unit 12 stores, for example, the temperature information.

The storage unit 12 stores, for example, the first analysis target term. The storage of the first analysis target term means, specifically, storing information indicating a form of the first analysis target term, such as variables and an order constituting the first analysis target term, and a value of a coefficient of the first analysis target term. The storage unit 12 stores, for example, the second analysis target term. Storing the second analysis target term means, specifically, storing information indicating a form of the second analysis target term, such as variables and an order constituting the second analysis target term, and a value of a coefficient of the second analysis target term. The storage unit 12 stores, for example, the first solution. The storage unit 12 stores, for example, the second solution. The storage unit 12 stores, for example, the combinatorial condition in advance.

The input unit 13 includes an input device such as a mouse, a keyboard, and a touch panel. The input unit 13 may be configured as an interface that connects these input devices to the host device. The input unit 13 receives an input of various types of information to the host device. The input unit 13 receives an input of the analysis target function. The reception of the input of the analysis target function specifically means receiving an input of the form information, the equation coefficient information, and the zero information. The input unit 13 outputs the input analysis target function to the control unit 11 and the storage unit 12.

The output unit 14 outputs a candidate for the conditional solution of the analysis target function acquired by the solution candidate acquisition unit 112. The output unit 14 may be any unit as long as the unit can output the candidate for the acquired conditional solution of the analysis target function. The output unit 14 includes a display device such as a cathode ray tube (CRT) display, a liquid crystal display, and an organic electro-luminescence (EL) display. The output unit 14 may be configured as an interface for connecting these display devices to the host device.

The state measurement unit 15 measures the target quantum state of the annealing target system using the quantum annealing scheme. The state measurement unit 15 acquires the first solution by measuring the target quantum state. The state measurement unit 15 controls the state of the annealing target system based on the annealing control information each time the state measurement unit 15 acquires the annealing start instruction. The state measurement unit 15 measures one of states of the annealing target system, which is the target quantum state that is one of states controlled by the state measurement unit 15.

The control of the state of the annealing target system based on the annealing control information is, specifically, to control the state of the annealing target system so that the state is a state in which the following Hamiltonian condition is satisfied. The Hamiltonian condition is a condition that the Hamiltonian of the annealing target system is a Hamiltonian expressed by Equation (8), and values of respective variables other than the variable q in Equation (8) and constants are values indicated by the annealing control information. The annealing target system is controlled, for example, by the state measurement unit 15 applying a magnetic field to the annealing target system. A temperature of the annealing target system when the state measurement unit 15 measures the state is the temperature indicated by the temperature information.

The values of the variable X and the variable x at the time of execution of the first optimization processing are the initial values of the variable X and the variable x until the execution of the second optimization processing is started.

Figure 3:
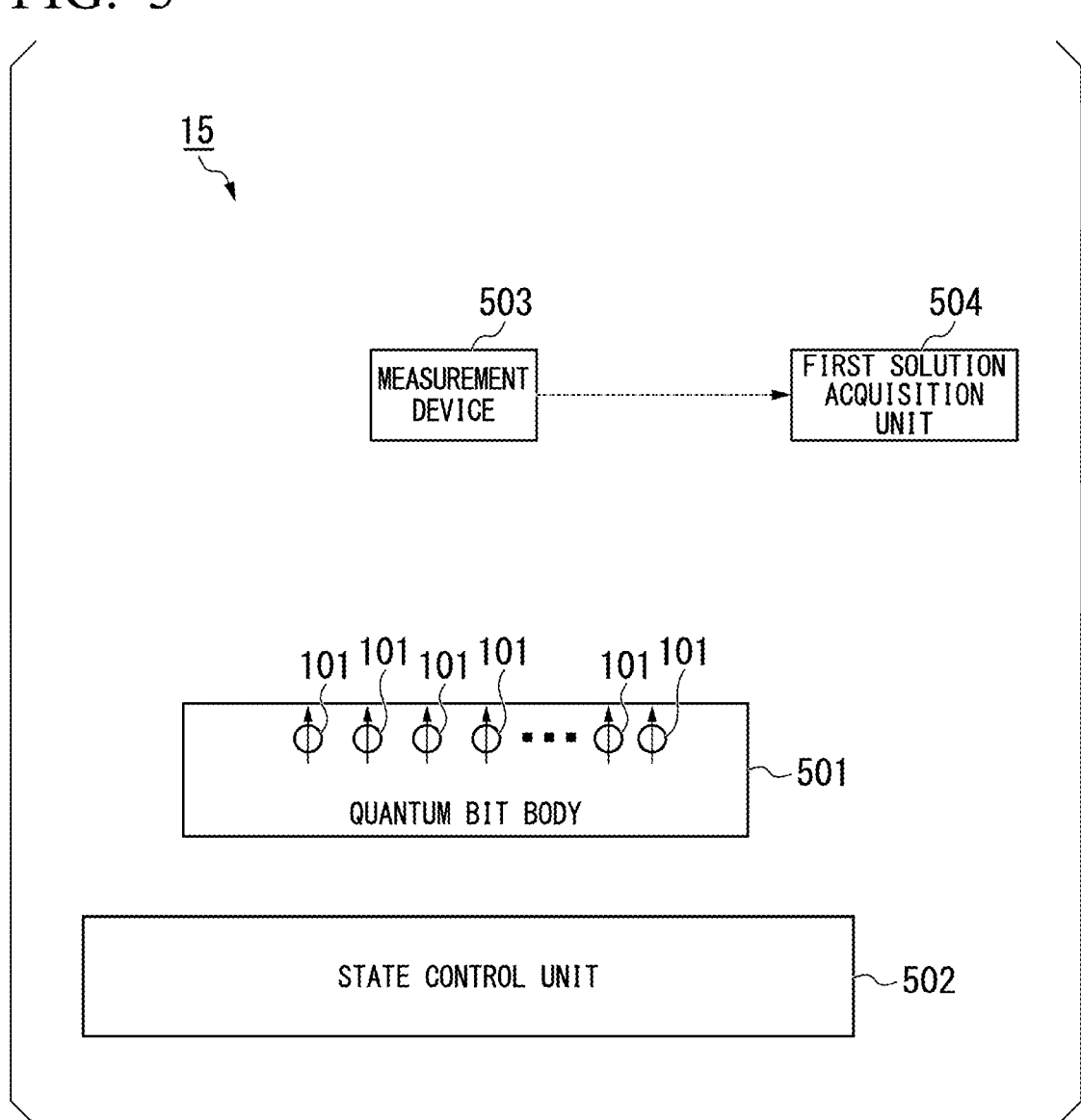
FIG. 3 is an illustrative diagram illustrating an example of a state measurement unit 15 in the embodiment.

FIG. 3 is an illustrative diagram illustrating an example of the state measurement unit 15 in the embodiment.

The state measurement unit 15 includes a quantum bit body 501, a state control unit 502, a measurement device 503, and a first solution acquisition unit 504.

The quantum bit body 501 includes a plurality of physical quantum bits 101. The quantum bit body 501 is, for example, a semiconductor substrate having quantum dots. In such a case, the physical quantum bit 101 is, for example, the spin of the electron in the quantum dot. The quantum bit body 501 may be a diamond base having a nitrogen defect. In such a case, the physical quantum bit 101 is, for example, the spin of the electron in the nitrogen defect. The quantum bit body 501 may be a superconducting circuit. In such a case, the physical quantum bit 101 is, for example, a superconducting quantum bit. The quantum bit body 501 is an example of the annealing target system.

The state control unit 502 controls a state of the quantum bit body 501. More specifically, the state control unit 502 controls the state of the quantum bit body 501 so that a Hamiltonian of the quantum bit body 501 is a Hamiltonian satisfying the Hamiltonian condition.

For example, when the physical quantum bit 101 of the quantum bit body 501 is a superconducting quantum bit, the state control unit 502 controls the state of the quantum bit body 501 through control of a current flowing through each superconducting circuit and control of a magnetic field applied to the quantum bit body 501. In such a case, the state control unit 502 is a device including, for example, a circuit that controls the current flowing through the superconducting circuit, and a magnetic field generation device. The state control unit 502 may further control the temperature. The state control unit 502 may also control the state of the quantum bit body 501 through temperature control. In such a case, the state control unit 502 includes, for example, a heater or a cooler. The state control unit 502 controls, for example, the temperature so that the temperature becomes the temperature indicated by the temperature information. It is preferable for measurement of the state of the quantum bit body 501 to be at a low temperature lower than room temperature. In particular, it is preferable for the measurement to be performed at 0K. Hereinafter, the combinatorial optimization problem processing apparatus 1 in an example of a case in which the physical quantum bit 101 is a spin of an electron, which is a case in which a temperature at the time of measurement is 0K, for simplicity of description, will be described.

The measurement device 503 measures a quantum state of the quantum bit body 501. The measurement device 503 may be any device as long as the device can acquire the quantum state of the quantum bit body 501. Specifically, the quantum state of the quantum bit body 501 is a quantum state of the plurality of physical quantum bits 101. The measurement device 503 may be, for example, a device including a magnetic flux meter or may be a device including an optical sensor. The measurement device 503 determines whether or not the state of the quantum bit body 501 is the target quantum state on the basis of a measurement result. More specifically, the measurement device 503 determines that the state of the quantum bit body 501 is the target quantum state when a predetermined condition regarding the local maximum value of the partition function Z is satisfied. The predetermined condition regarding the local maximum value of the partition function Z (hereinafter referred to as a "local maximum condition") is, for example, a condition that a value of a first derivative of the partition function Z is a value within a predetermined range including 0, and a sign of the first derivative of the partition function Z is a change from plus to minus.

Here, an operation of the state control unit 502 and the measurement device 503 will be described in greater detail. When the state control unit 502 acquires the annealing start instruction, the state control unit 502 changes the state of the quantum bit body 501. Specifically, the state control unit 502 changes the state of the quantum bit body 501 so that the quantum state of each physical quantum bit 101 is changed.

The measurement device 503 measures the state of the quantum bit body 501 changed by the state control unit 502. The measurement device 503 determines whether or not the state of the quantum bit body 501 is the target quantum state on the basis of the measurement result. When the measurement device 503 determines that the state is not the target quantum state, the state control unit 502 changes the state of the quantum bit body 501 again. It is preferable for change in the state of the quantum bit body 501 to be performed adiabatically. The measurement device 503 measures the state of the quantum bit body 501 after the change. Hereinafter, the same processing is executed until the local maximum condition is satisfied. Through such repetition, the measurement device 503 measures the state of each physical quantum bit 101 in the target quantum state.

The first solution acquisition unit 504 acquires a value indicating the state of each physical quantum bit 101 in the target quantum state of the quantum bit body 501 and a probability density with which each state occurs, on the basis of a measurement result of the measurement device 503. The state of the physical quantum bit 101 is, for example, a direction and magnitude of the spin of the electron when the physical quantum hit 101 is the spin of the electron. The value indicating the state of each physical quantum bit 101 acquired by the first solution acquisition unit 504 is the value of the variable q in the first solution. The probability density with which the state occurs is the probability density of each value of the variable q in the first solution. That is, the first solution acquisition unit 504 acquires the first solution through measurement. The first solution acquired by the first solution acquisition unit 504 is stored in the storage unit 12. The first solution acquired by the first solution acquisition unit 504 may be output to the control unit 11.

Figure 4:
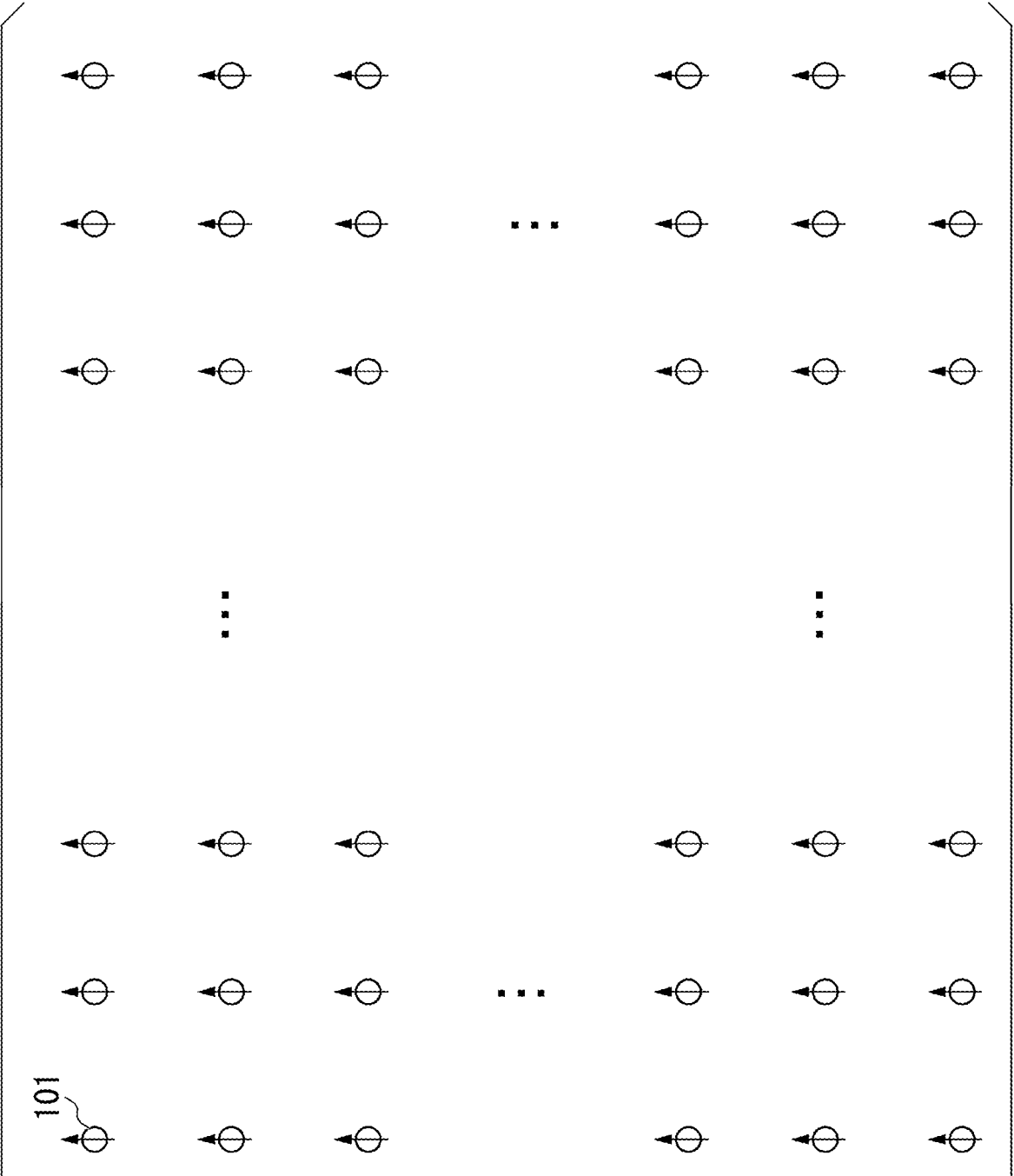
FIG. 4 is a diagram illustrating an example of a positional relationship of a plurality of physical quantum bits 101 in the embodiment.

FIG. 4 is a diagram illustrating an example of a positional relationship of the plurality of physical quantum bits 101 in the embodiment. FIG. 4 is a diagram of the plurality of physical quantum bits 101 located in the quantum bit body 501. FIG. 4 illustrates that the plurality of physical quantum bits 101 are located in a grid pattern.

Figure 5:
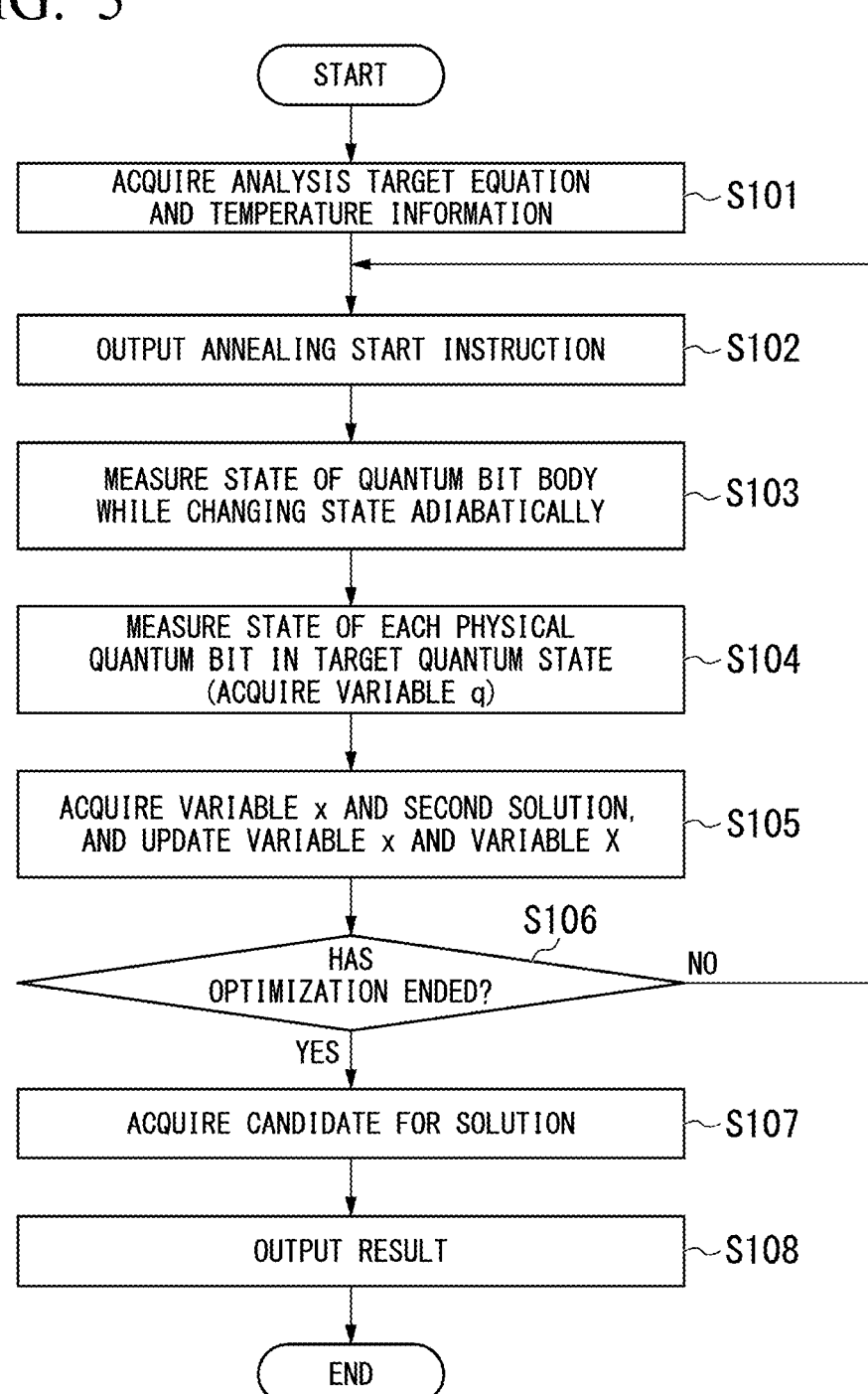
FIG. 5 is a flowchart illustrating an example of a flow of processing that is executed by the combinatorial optimization problem processing apparatus 1 of the embodiment.

FIG. 5 is a flowchart illustrating an example of a flow of processing that is executed by the combinatorial optimization problem processing apparatus 1 of the embodiment.

The condition acquisition unit 111 acquires the analysis target function and the temperature information (step S101). Then, the state measurement control unit 114 outputs the annealing start instruction to the state measurement unit 15 (step S102). Then, the state measurement unit 15 measures the state of the quantum bit body 501 while changing the state of the quantum bit body 501 so that the Hamiltonian condition is satisfied until the local maximum condition is satisfied (step S103). Then, the state measurement unit 15 measures the state of each physical quantum bit 101 in the target quantum state (step S104). Because the state of each physical quantum bit 101 measured in step S104 indicates the value of the variable q and the probability density of each value of the variable q, the processing from step S103 to step S104 are the first optimization processing and is processing for acquiring the first solution.

After step S104, the non-annealing calculation unit 113 acquires the second solution using the non-annealing scheme based on a result of step S104 (step S105). The non-annealing calculation unit 113 updates the value of the variable X stored in the storage unit 12 with the acquired second solution. Further, when the non-annealing calculation unit 113 acquires the second solution, the non-annealing calculation unit 113 updates the value of the variable x stored in the storage unit 12 with the value expressed by Equation (13) based on the result of step S104. More specifically, the value of the variable x is updated with the expected value of the variable q using the value of the variable q and the probability density of each value of the variable q acquired in the immediately preceding step S104. The processing for step S105 is the second optimization processing.

After step S105, the solution candidate acquisition unit 112 determines whether or not the optimization end condition is satisfied (step S106). When the optimization end condition is satisfied (step S106: YES), the solution candidate acquisition unit 112 acquires the first solution acquired by the immediately preceding first optimization processing as the candidate for the conditional solution of the analysis target function (step S107). After step S107, the output unit 14 outputs the candidate for the conditional solution acquired in step S107 (step S108).

On the other hand, when the optimization end condition is not satisfied in step S106, the processing returns to step S102.

The combinatorial optimization problem processing apparatus 1 of the embodiment configured in this way acquires the candidate for the conditional solution of the analysis target function by using the partition function Z having Equation (1) as a Hamiltonian, instead of Equation (1) itself. The partition function Z is transformed into an equation including only second- or lower-order terms of the variable q by using the variable X not present in the variable (1).

Therefore, the combinatorial optimization problem processing apparatus 1 alternately repeats the first optimization processing and the second optimization processing. The variable q satisfying the first partition function condition is acquired by repeating the first optimization processing and the second optimization processing. Among the variables q acquired by repeating the first optimization processing and the second optimization processing, the variable q at a point in time when the optimization end condition is satisfied is a candidate for the solution of the combinatorial optimization problem represented by the analysis target function.

Incidentally, a solution of the equation including only second- or lower-order terms of the variable q can be acquired using an annealing scheme. Therefore, the combinatorial optimization problem processing apparatus 1 includes the state measurement unit 15 that executes annealing. Therefore, the combinatorial optimization problem processing apparatus 1 configured in this way can acquire the candidates for the solution of the combinatorial optimization problem represented by the function including the third- or higher-order terms of the variable by using the annealing scheme.

Modification Example

The state measurement unit 15 does not necessarily have to acquire the first solution through quantum annealing. The state measurement unit 15 may acquire the first solution through, for example, non-quantum annealing. A device that acquires the first solution through non-quantum annealing is, for example, a complementary MOS (CMOS) annealing machine.

The delta function of Equation (4) and an exponent of the partition function Z expressed by Equation (6) do not necessarily have to be expressed by the Fourier integral representation as long as the delta function and the exponent are predetermined integral representations using the variable X. More specifically, the predetermined integral representation may be any integral representation as long as an auxiliary variable can be introduced into an exponent of an exponential function representing the partition function Z.

The combinatorial condition does not necessarily have to be stored in the storage unit 12 in advance, and may be input via the input unit 13, for example.

The combinatorial optimization problem processing apparatus 1 may be implemented by using a plurality of information processing devices communicatively connected via a network. In this case, the respective functional units included in the combinatorial optimization problem processing apparatus 1 may be distributed and implemented in a plurality of information processing devices. For example, the condition acquisition unit 111, the solution candidate acquisition unit 112, the non-annealing calculation unit 113, the state measurement control unit 114, and the state measurement unit 15 may be implemented in different information processing devices.

The control unit 11 may include the first solution acquisition unit 504.

The partition function Z expressed by Equation (6) is an example of a root finding target partition function. The state measurement unit 15 is an example of an annealing unit. The non-annealing calculation unit 113 is an example of a calculation unit. The first analysis target term is an example of a first equation. The second analysis target term is an example of a second equation.

The embodiment of the present invention has been described above in detail with reference to the drawings, but a specific configuration is not limited to the embodiment, and a design or the like within a range not departing from the gist of the present invention is also included.

REFERENCE SIGNS LIST

1 Combinatorial optimization problem processing apparatus
11 Control unit
12 Storage unit
13 Input unit
14 Output unit
15 State measurement unit
111 Condition acquisition unit
112 Solution candidate acquisition unit
113 Non-annealing calculation unit
114 State measurement control unit
501 Quantum bit body
502 State control unit
503 Measurement device
504 First solution acquisition unit

The invention claimed is:

1. A combinatorial optimization problem processing apparatus comprising:
a quantum annealer configured to acquire, using an annealing scheme, a candidate for a first solution in an alternate optimization algorithm in which a first optimization processing and a second optimization processing are repeated until a predetermined end condition is satisfied;
a processor; and
a storage medium having computer program instructions stored thereon, wherein the computer program instructions, when executed by the processor, perform processing of:
acquiring a second solution; and
acquiring a candidate for an immediately preceding first solution when the predetermined end condition is satisfied, as a candidate for a solution of a combinatorial optimization problem that is an analysis target,
wherein the first solution is a variable q that satisfies a first predetermined condition regarding a maximum value of a root finding target partition function and that is acquired by the first optimization processing, the first optimization processing acquiring a value of the variable q satisfying the first predetermined condition, the variable q being a sole independent variable of the first optimization processing, the root finding target partition function being a partition function whose Hamiltonian is an analysis target function, the analysis target function being a function representing the combinatorial optimization problem and is a function including third- or higher-order terms of the variable q, the Hamiltonian being represented by a predetermined integral representation using a variable X, the Hamiltonian being represented by a sum of a first equation that includes only second- or lower-order terms of the variable q and a second equation not including the variable q, the second solution being the variable X that satisfies a second predetermined condition regarding a maximum value of the root finding target partition function and that is acquired by the second optimization processing, the second optimization processing acquiring a value of the variable X satisfying the second predetermined condition, the variable X being the sole independent variable of the second optimization processing,
wherein the quantum annealer includes a plurality of physical quantum bits, and
wherein the quantum annealer is configured to measure quantum states of the physical quantum bits to acquire the candidate for the first solution.

2. The combinatorial optimization problem processing apparatus according to claim 1, wherein the first predetermined condition is a condition that a value of the partition function is a local maximum value.

3. The combinatorial optimization problem processing apparatus according to claim 1, wherein the second predetermined condition is a condition that a value of the partition function is a local maximum value.

4. The combinatorial optimization problem processing apparatus according to claim 1, wherein the predetermined integral representation is a Fourier integral representation.

5. The combinatorial optimization problem processing apparatus according to claim 1, wherein the annealing scheme is quantum annealing.

6. The combinatorial optimization problem processing apparatus according to claim 1, wherein the second solution is acquired using a root finding algorithm.

7. A non-transitory computer-readable storage medium device which stores a program for causing a computer to function as the combinatorial optimization problem processing apparatus according to claim 1.

8. The combinatorial optimization problem processing apparatus according to claim 1, wherein the plurality of physical quantum bits comprise spins of electrons in quantum dots on a semiconductor substrate, spins of electrons in nitrogen defects in a diamond base, or superconducting quantum bits in a superconducting circuit.

9. The combinatorial optimization problem processing apparatus according to claim 1, wherein the quantum annealer further comprises a circuit configured to control a state of the plurality of physical quantum bits by controlling at least one of a current or a magnetic field applied to the plurality of physical quantum bits so that a Hamiltonian of the plurality of physical quantum bits corresponds to the first equation.

10. The combinatorial optimization problem processing apparatus according to claim 1, wherein the quantum annealer further comprises a circuit configured to control a state of the plurality of physical quantum bits of the quantum annealer by controlling at least one of a current or a magnetic field applied to the plurality of physical quantum bits so that a Hamiltonian of the plurality of physical quantum bits corresponds to the first equation.

11. A combinatorial optimization problem processing method comprising:
acquiring, by a quantum annealer using an annealing scheme, a candidate for a first solution in an alternate optimization algorithm in which a first optimization processing and a second optimization processing are repeated until a predetermined end condition is satisfied; and implementing a processor and a storage medium having instructions stored thereon to perform by the processor:
acquiring a second solution; and
acquiring a candidate for an immediately preceding first solution when the predetermined end condition is satisfied, as a candidate for a solution of a combinatorial optimization problem that is an analysis target, wherein the first solution is a variable q that satisfies a first predetermined condition regarding a maximum value of a root finding target partition function and that is acquired by the first optimization processing, the first optimization processing acquiring a value of the variable q satisfying the first predetermined condition, the variable q being a sole independent variable of the first optimization processing, the root finding target partition function being a partition function whose Hamiltonian is an analysis target function, the analysis target function being a function representing the combinatorial optimization problem and is a function including third- or higher-order terms of the variable q, the Hamiltonian being represented by a predetermined integral representation using a variable X, the Hamiltonian being represented by a sum of a first equation that includes only second- or lower-order terms of the variable q and a second equation not including the variable q, the second solution being the variable X that satisfies a second predetermined condition regarding a maximum value of the root finding target partition function and that is acquired by the second optimization processing, the second optimization processing acquiring a value of the variable X satisfying the second predetermined condition, the variable X being the sole independent variable of the second optimization processing, wherein the quantum annealer includes a plurality of physical quantum bits, and wherein the quantum annealer is configured to measure quantum states of the physical quantum bits to acquire the candidate for the first solution.

* * * * *